July 19, 1966     J. R. JONES     3,261,598
SPRING MECHANISM
Filed July 2, 1964
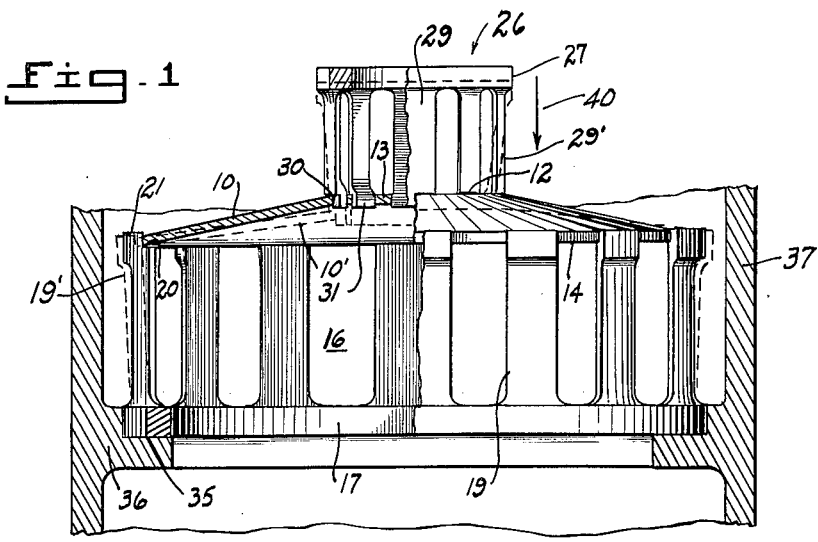
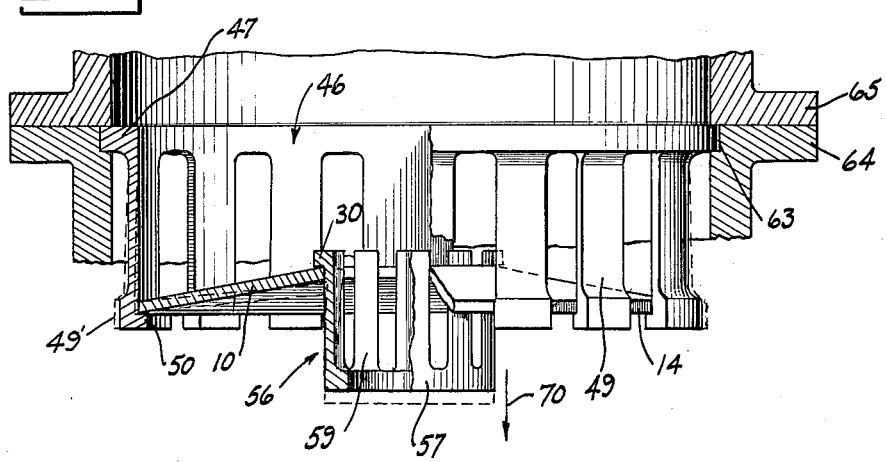
INVENTOR.
John Roger Jones
BY Darby & Darby
ATTORNEYS United States Patent Office 3,261,598
Patented July 19, 1966

3,261,598
SPRING MECHANISM
John Roger Jones, Manhattan Beach, Calif., assignor to Fairchild Hiller Corporation, Hagerstown, Md., a corporation of Maryland
Filed July 2, 1964, Ser. No. 379,797
12 Claims. (Cl. 267—1)

This invention relates to springs and more particularly to spring mechanisms including improved mounting arrangements for disc type springs.

Disc springs, commonly called Belleville springs, are formed by a single piece of spring material of generally frustro-conical shape. The faces of a disc spring may be flat or concavo-convex, that is, one face concave and the other convex. In most instances an opening is formed in the center of a disc spring, that is, around the central axis of the spring along which the load is generally applied and in whose general direction the spring deforms. Throughout the remainder of the specification and claims disc springs of this general type, whether the faces are flat or curved, are called disc springs or dished disc springs.

Disc springs are being used in an increasing number of applications, particularly in cases where heavy loads have to be accommodated. While disc springs are admirably suited to the task of handling heavy loads, they also have desirable characteristics for use as reference springs to set a load point in control devices such as pneumatic regulators. In applications of this type, a predetermined force exerted on the disc spring produces a predetermined degree of deformation which is used to actuate or initiate a control function. The desirable characteristics of disc springs for control applications includes compactness, low weight for a given load capability, and low spring rate at the set load point. The spring rate is conventionally defined as the ratio of the spring load to spring deflection or deformation so a disc spring has a relatively large deformation at the set load point in response to a load.

When used, a disc spring is usually loaded between two flat surfaces, one of which makes contact with a face of the spring at the central opening while the other makes contact with a spring face at the outer periphery or edge. Application of force by either loading surface causes the spring to deform in a direction to absorb the load. The deformation will be generally in a direction along the spring axis so that the spring will tend to flatten.

When a disc spring is loaded between two flat surfaces, as described above, substantial frictional forces are produced at the contacting spring faces and loading surfaces by the relative motion produced therebetween. This friction causes rather severe hysteresis losses during spring loading as the spring is deflected about its set point. As is known, hysteresis losses result in the spring giving out less energy than is applied to deform it. This is undesirable in most cases, and particularly in control applications, because it results in a time lag between application of the input force and the resultant deformation of the spring. Also, the spring deformation will not be directly proportional to the applied load.

The present invention is directed to a spring mechanism utilizing disc springs in which improved mounting arrangements are provided to reduce contact friction between the loading surfaces and the spring thereby reducing hysteresis losses. In accordance with the invention the mounting arrangements include two supports, one of which is used to hold the outer edge of a disc spring and the other to hold the spring at or near the central opening. Each support has a resilient member capable of expanding in a direction radial to the axis of the spring. In a preferred embodiment of the invention the resilient members are formed by a plurality of fingers which are substantially rigid in the direction of the spring axis but are flexible in a direction radial thereto. Application of a load to the spring produces a radial deformation of the resilient members of both supports in addition to deformation of the spring. This reduces contact friction between the spring faces and the supports, which are the loading members here, thereby reducing hysteresis losses. In accordance with the invention the supports may be mounted with respect to the spring for tension or compressive loads or any combination thereof.

It is therefore an object of this invention to provide improved mounting arrangements for disc springs of the so-called Belleville type.

Another object is to provide spring mechanisms utilizing a disc spring with respective resilient mounting support located at the central opening of the spring and at its outer edge.

A further object is to provide spring mechanisms including a disc spring having a central opening and two supports each having a number of spring-like fingers engaging the spring for producing radial movement of the fingers in response to an axial load on the spring.

Still another object is to provide improved mounting arrangements for disc springs with a central opening in which two supports are used, each support having a number of spring fingers which are flexible in a direction radial to the spring axis, the fingers of one support engaging the spring at or near the central opening and the fingers of the other support engaging the spring at its outer edge to produce radial movement and reduce contact friction between the spring and its supports.

Other objects and advantages of the present invention will become more apparent upon reference to the following specification and annexed drawings in which:

FIGURE 1 is an elevational view, partially in section, of a spring mechanism according to the present invention for a compressional mount of the spring mechanism; and FIGURE 2 is a elevational view, partially in section, of another embodiment of the invention for a tensional mount of the spring mechanism.

FIGURE 1 shows a generally frustro-conical disc spring 10 formed by a single piece of a suitable spring material such as metal, flexible plastic, nylon, etc. The faces of spring 10 may be either concavo-convex or flat and an opening 12 defined by an inner edge 13 is provided at the center thereof. The axis of the spring passes through the center of opening 12 in a direction substantially perpendicular to the general plane in which the opening lies. The outer edge of spring 10 is designated by reference numeral 14.

First and second supports 16 and 26 are used to hold the spring 10 in a compression type of mount in FIG. 1. The first support 16 which holds the outer edge 14 includes a ring shaped base 17 on which is mounted a number of radially flexible fingers 19, extending generally parallel of the spring axis. Base 17 is made of any suitable material, such as metal, and the fingers 19 are made of the same or any other suitable material which has the desired properties of rigidity in the axial direction under rated spring loading conditions and flexure in a direction radial to the spring axis. Many suitable materials of this type are available, for example, brass, spring stock, etc. As should be clear, fingers 19 form a flexible arrangement which is free to move in a direction radial to the spring axis.

The lower ends of the fingers 19 are fastened to the base 17 by any suitable process such as welding, brazing, soldering, etc., depending upon the various materials used. If desired, the base member 17 and the fingers 19 may be integrally formed by any suitable process, such as molding or casting.

The upper end of each finger 19 is formed with a shoulder or ledge 20 on which the edge of the lower face of spring 10 rests. An upstanding tab 21 is provided adjacent the shoulders of the fingers to engage the peripheral edge 14 of the spring. This assembly is preferably made so that the peripheral edge 14 engages the tabs 21 in a rest position when the spring is undistorted. Thus, any deflection of the spring 11 will produce movement of the fingers. Of course, the fingers may be initially distorted if desired to have a predetermined radial deflection at a time before force is applied to the spring. If desired, the upper end of each finger may be bent over or crimped around the upper surface of spring 10 to hold it firmly to the fingers 19.

The second support 26 is used to hold the spring at the central opening 12. Support 26 is similar in most respects to support 16 and has a similar ring type base 27 from which depend downwardly a number of fingers 29 generally parallel to the spring axis. Fingers 29 are also made of a suitable material which is substantially rigid axially of the spring and flexible radially. This material may be the same as the material for fingers 19 or it may be different. The coefficients of radial flexure for fingers 19 and 29 may be made the same or different, as desired by selecting different materials and/or making the thickness of the walls of the fingers different.

The lower end of each of the fingers 29 is formed with a shoulder 30, which rests on the top surface of the spring 10 near the opening 12, and a tab 31 which engages the inner peripheral edge 13. If desired, the ends of fingers 29 may be crimped around edge 13 and onto the lower surface of the spring to hold the second support 26 firmly to the spring.

As can be seen, the spring mechanism of FIG. 1 is an axially rigid structure which retains the positions for its respective elements indicated by the solid lines when no load is applied. When used, in the compressive mounting arrangement of FIG. 1, the spring mechanism is usually placed on a suitable type of mounting so that force can be applied to the second or smaller support 26 at the opening 12. Of course, the reverse arrangement can be used and force applied to the larger support 16. Also, a mounting can be used wherein force is compressively applied to both the inner and outer edges of spring 10 through both supports 16 and 26. In FIG. 1 the former arrangement is used, and the base 17 of the larger support 16 is shown resting on the ledge or shoulder 35 of a collar 36 within a housing or base 37 which is considered to be stationary for the purpose of illustration. Base 17 may just rest on ledge 35 or it may be fastened thereto by any suitable fastening means or process.

The operation of the spring mechanism of FIG. 1 is as follows. A compressional force applied to support 26 in the direction of the arrow 40 by any suitable means such as a shaft, actuator, etc., is transmitted axially through fingers 29 to the spring 10. As the spring 10 starts to deflect toward the flattened deformed position shown by the dotted outline 10', its inner edge 13 and outer edge 14 have a component of motion or force radial to the axis. This radial component causes the edges 13 and 14 to transmit force to the respective tabs 31 and 21 and to deflect both sets of fingers 29 and 19 to the positions shown by dotted lines 29' and 19'. As can be seen, since the spring 10 tends to flatten as additional force is applied, the fingers 29 are moved radially inwardly while the fingers 19 are moved radially outwardly corresponding amounts proportional to the applied force and spring deformation.

It should be understood that the above-described structure and operation of the spring mechanism has several advantages. First of all, there is relatively little relative motion, producing friction, between the inner and outer edges 13 and 14 of the spring and the fingers 29 and 19. This is so because as a load is applied the radial component of motion of the spring as it is flattened is substantially converted into a radial deflection of the fingers 19 and 29. Because there is relatively little friction produced there is relatively little hysteresis loss and the spring 10 begins to be deformed substantially instantaneously as force is applied. This is quite different from the case where the spring is loaded between two flat surfaces and there is substantial relative motion between the loading surfaces and the faces of the spring producing friction and hysteresis losses.

As additional advantages for the spring mechanisms of the present invention the transmission of some of the loading force in the radial direction by the fingers 19 and 29 permits greater loads to be accommodated by the entire spring mechanism. It should be noted that the two resilient structures formed by fingers 19 and 29 effectively split the radial load component between them. Also, a force applied off-axis of the spring will still be taken care of to reduce friction between the spring and the supports due to the independent suspension of the fingers 19 and 29. Stated another way, an off-axis force will cause those fingers in the direction of the off-axis force to be moved radially more than the other fingers of the support. This could not be done if a single continuous flexible or resilient member is used.

FIGURE 2 shows another embodiment of the invention which is designed for a tension spring support. The same reference numerals are utilized as in FIG. 1 where applicable. A support 46, similar to support 16, is provided for the outer edge 14 of the spring 10. Support 46 has a number of fingers 49 extending downwardly from a base 47. The bottom of each finger 49 is formed with a ledge 50 on which the lower face of spring 10 rests near its outer edge 14. The edge 14 normally engages the inner walls of the fingers 10 in the undeformed condition of the mechanism shown by the solid lines.

The support 56 for the opening 12 has base 57 from which extend upwardly the spring fingers 59. The upper ends of these fingers are formed with flanges 30 which rest on the upper surface of the spring member 10 near the inner edge 13. The inner edge 13 of the spring engages the outer walls of the fingers 59. As shown, the base 47 of support 46 is mounted on a shoulder 63 formed on a collar 64 and held thereto by a second collar 65 whose base serves as a clamp. Thus, the entire spring mechanism is supported in a tensional mount.

A tensional force applied in the direction of arrow 70 to move support 56 downwardly causes the spring 10 to also start to deform downwardly. When this occurs, the fingers 49 are moved outwardly toward the position shown by the dotted outline 49' while the fingers 59 are moved inwardly. The same advantages described above for the spring mechanism of FIG. 1 are obtained here.

It should be understood that any combination of the compression or tension mountings of FIGS. 1 and 2 may be utilized as desired. For example, a compression type mounting can be used for support 16, as shown in FIG. 1, and support 26 can be mounted by a tension support in the manner of support 56 of FIG. 2. The reverse arrangement is also possible so that the tension support 46 of FIG. 2 can be used and support 56 mounted for compression support like support 26 of FIG. 1. It should also be understood that any combination of compressive or tensional forces applied at the same time may be accommodated by changing the mountings for the supports.

To reduce hysteresis losses, best results are obtained by using a large number of spring fingers 19 and 29, or 49 and 59, and by reducing the circumferential contact of each finger to minimize relative motion between the spring and the support surfaces. This can be done, for example, by tapering each of the surfaces of a respective spring finger where it contacts spring 10. As an example of this, the inner surface of vertical tab 21 and the upper surface of ledge 20 can be made curved so that contact therewith is made by the spring only at a single point on the curved surfaces. Also, ball bearings can be used at the points of contact between the spring and the fingers.

While preferred embodiments of the invention have been described above, it will be understood that these are illustrative only, and the invention is limited solely by the appended claims.

What is claimed is:

1. A spring mechanism comprising:
a disc spring having an opening in the center thereof defined by an inner edge,
first and second support means each having a resilient member movable radially of the spring axis, the resilient member of the first support means engaging the outer edge of the spring and the resilient member of the second support means engaging said inner edge, force applied to the mechanism causing the spring to deform and produce a force component radial to the spring axis thereby producing movement of the resilient members radial of the axis.

2. A spring mechanism comprising:
a disc spring having a central opening defined by an inner edge,
first and second support means, each support means having a plurality of individually suspended flexible members free to move radially of the spring axis, the resilient members of the first support means engaging the outer edge of the spring and the resilient members of the second support means engaging said inner edge, force applied to the mechanism causing the spring to deform and produce a force component radial to the spring axis thereby producing movement of the flexible members of each support means radial to the axis by a corresponding amount.

3. A spring mechanism comprising:
a disc spring having a central opening defined by an inner edge,
first and second support means, each support means having a base from which extends a flexible member movable radially of the spring axis, the resilient member of the first support means engaging the outer edge of the spring and the resilient member of the second support means engaging said inner edge, force applied to the mechanism producing deformation of the spring and a force component radial to the spring axis which moves the flexible member radial to the axis.

4. A spring mechanism comprising:
a disc spring having an opening in the center thereof defined by an inner edge,
first and second support means each having a base, a plurality of individually mounted members on each base which are flexible radial of the spring axis, the resilient members of the first support means engaging the outer edge of the spring and the resilient members of the second support means engaging said inner edge, force applied to the mechanism producing deformation of the spring and a force component radial to the spring axis which also moves the flexible members radial to the axis.

5. A spring mechanism as set forth in claim 4 and further comprising means for locating the flexible members of the first and second support means with respect to the springs so that the respective flexible members thereof are moved in opposite directions.

6. A spring mechanism comprising:
a disc spring having a central opening defined by an inner edge,
first and second support means, each support means having a base on which is mounted a plurality of finger members which are substantially rigid in one direction and flexible in another direction,
means on the finger members of said first support means for engaging the outer edge of the spring,
means on the finger members of said second support means for engaging said inner edge, force applied to the spring mechanism having a component axial of the spring producing flexure of the finger members in their respective directions of flexibility.

7. A spring mechanism comprising:
a disc spring having a central opening defined by an inner edge,
first and second support means, each support means having a base on which is mounted a plurality of individual finger members which are substantially rigid axially of the spring and flexible radially of the spring axis,
means on the finger members of said first support means for engaging the outer edge of the spring,
means on the finger members of said second support means for engaging said inner edge, force applied to the spring mechanism having a component axial of the spring producing deformation of the spring and flexure of the radial to the spring axis.

8. A spring mechanism as set forth in claim 7 and further comprising means for locating the finger members of the first and second support means with respect to the spring so that the respective finger members of the support means are moved in opposite directions.

9. A spring mechanism comprising:
a disc spring having a central opening defined by an inner edge,
first and second support means, each support means having a base on which is mounted a plurality of individual finger members which are substantially rigid axially of the spring and flexible radially of the spring axis,
means on the finger members of said first support means for engaging the outer edge of the spring to produce radial movement of the finger members thereon outwardly of the spring axis in response to a force applied to the spring mechanism,
and means on the finger members of said second support means for engaging the inner edge of the spring at said central opening to produce radial motion of the finger members thereon in toward the spring axis in response to a force applied to the spring mechanism.

10. A spring mechanism comprising:
a disc spring having a central opening defined by an inner edge,
first and second support means, each support means having a base on which is mounted a plurality of individual finger members which are substantially rigid axially of the spring and flexible radially of the spring axis,
means on the finger members of said first support means for engaging the outer edge of the spring to produce radial movement of the finger members thereon outwardly of the spring axis when a compressive force is applied to the spring mechanism,
and means on the finger members of the second support means for engaging said inner edge to produce radial movement of the finger members thereon inwardly toward the spring axis when a compressive force is applied to the spring mechanism.

11. A spring mechanism comprising:
a disc spring having a central opening defined by an inner edge,
first and second support means, each support means having a base on which is mounted a plurality of individual finger members which are substantially rigid axially of the spring and flexible radially of the spring axis,
means on the finger members of said first support means for engaging the outer edge of the spring to produce radial movement of the finger members thereon outwardly of the spring axis when a tension force is applied to the spring mechanism,
and means on the finger members of said second support means for engaging the inner edge of the spring to produce radial movement of the finger members thereon inwardly toward the spring axis when a tension force is applied to the spring mechanism.

12. A mounting for a disc spring having a central opening defined by an inner edge and an outer peripheral edge comprising:
a base,
a plurality of finger members individually mounted on said base and extending therefrom, said finger members being substantially rigid in a direction along the spring axis and flexible in a direction radial thereto,
and means on said finger members for engaging one of said edges whereby force applied axially of the spring produces deformation of the spring and a radial component of force therefrom which causes said finger members to move radially.

No references cited.

ARTHUR L. LA POINT, *Primary Examiner.*
R. M. WOHLFARTH, *Assistant Examiner.*